United States Patent
Matsueda et al.

(10) Patent No.: US 10,279,338 B2
(45) Date of Patent: May 7, 2019

(54) EXHAUST GAS-PURIFYING CATALYST

(71) Applicant: CATALER CORPORATION, Kakegawa-shi, Shizuoka (JP)

(72) Inventors: Satoshi Matsueda, Kakegawa (JP); Akimasa Hirai, Kakegawa (JP); Kenichi Taki, Kakegawa (JP); Sho Hoshino, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/288,740

(22) Filed: Oct. 7, 2016

(65) Prior Publication Data

US 2017/0100709 A1  Apr. 13, 2017

(30) Foreign Application Priority Data

Oct. 8, 2015  (JP) ................................. 2015-200173

(51) Int. Cl.

| | |
|---|---|
| *B01J 23/89* | (2006.01) |
| *B01D 53/94* | (2006.01) |
| *B01J 23/00* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 23/652* | (2006.01) |
| *B01J 35/00* | (2006.01) |
| *B01J 37/03* | (2006.01) |
| *B01J 37/08* | (2006.01) |

(52) U.S. Cl.

CPC ........ *B01J 23/8946* (2013.01); *B01D 53/945* (2013.01); *B01J 23/002* (2013.01); *B01J 23/005* (2013.01); *B01J 23/42* (2013.01); *B01J 23/44* (2013.01); *B01J 23/464* (2013.01); *B01J 23/58* (2013.01); *B01J 23/6525* (2013.01); *B01J 23/6527* (2013.01); *B01J 23/8993* (2013.01); *B01J 35/0006* (2013.01); *B01J 37/031* (2013.01); *B01J 37/08* (2013.01); *B01D 2251/2062* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/204* (2013.01); *B01D 2255/207* (2013.01); *B01D 2255/2022* (2013.01); *B01D 2255/2042* (2013.01); *B01D 2255/2045* (2013.01); *B01D 2255/2047* (2013.01); *B01D 2255/2092* (2013.01); *B01D 2255/20738* (2013.01); *B01D 2255/20769* (2013.01); *B01D 2255/20776* (2013.01); *B01D 2255/40* (2013.01); *B01D 2255/405* (2013.01); *B01J 2523/00* (2013.01); *Y02T 10/22* (2013.01)

(58) Field of Classification Search
None
See application file for complete search history.

(56) References Cited

U.S. PATENT DOCUMENTS

| 4,049,583 | A | | 9/1977 | Lauder | |
|---|---|---|---|---|---|
| 4,089,810 | A | * | 5/1978 | Diwell | B01D 53/945 423/213.5 |
| 4,151,123 | A | * | 4/1979 | McCann, III | B01D 53/8668 502/303 |
| 6,511,642 | B1 | * | 1/2003 | Hatanaka | B01D 53/02 423/239.1 |
| 8,097,556 | B2 | * | 1/2012 | Matsueda | B01J 21/005 502/328 |
| 2005/0245391 | A1 | | 11/2005 | Tanaka et al. | |
| 2009/0286680 | A1 | * | 11/2009 | Hirano | B01J 37/0221 502/326 |
| 2010/0204039 | A1 | * | 8/2010 | Matsueda | B01J 23/002 502/302 |
| 2010/0227758 | A1 | * | 9/2010 | Yang | B01D 53/945 502/303 |
| 2012/0014841 | A1 | * | 1/2012 | Katsuki | B01D 53/9422 422/168 |

FOREIGN PATENT DOCUMENTS

| EP | 1 958 692 A1 | 8/2008 |
|---|---|---|
| EP | 2 351 611 A1 | 8/2011 |
| JP | 01-242149 | 9/1989 |

(Continued)

OTHER PUBLICATIONS

Extended European Search Report dated Feb. 13, 2017 in connection with European Patent Application No. EP 16002172.1-1371.

*Primary Examiner* — Melvin C. Mayes
*Assistant Examiner* — Colette B Nguyen
(74) *Attorney, Agent, or Firm* — John P. White; Cooper & Dunham LLP (57) ABSTRACT

An exhaust gas-purifying catalyst includes a support and a catalytic metal supported thereby. The support includes a composite oxide represented by $AO \cdot xB_{2-\alpha}C_\alpha O_3$, wherein A represents at least one of an element having a valence of 1 and an element having a valence of 2, B represents an element having a valence of 3, C represents one or more elements selected from iridium, ruthenium, tantalum, niobium, molybdenum, and tungsten, x represents a numerical value of 1 to 6, and α represents a numerical value greater than 0 and less than 2. The catalytic metal includes one or more precious metals selected from rhodium, palladium, and platinum.

6 Claims, 4 Drawing Sheets

(56) References Cited

FOREIGN PATENT DOCUMENTS

| | | |
|---|---|---|
| JP | 6-75675 | 9/1994 |
| JP | 10-202101 | 8/1998 |
| JP | 2004-041866 | 2/2004 |
| JP | 2004-041867 | 2/2004 |
| JP | 2004-041868 | 2/2004 |
| WO | WO 2007/007889 A1 | 1/2007 |

* cited by examiner

EXHAUST GAS-PURIFYING CATALYST

CROSS REFERENCE TO RELATED APPLICATION

This application is based upon and claims the benefit of priority from Japanese Patent Application No 2015-200173, filed Oct. 8, 2015, the entire contents of which are incorporated herein by reference.

BACKGROUND OF THE INVENTION

1. Field of the Invention

The present invention relates to an exhaust gas-purifying catalyst.

2. Description of the Related Art

As an exhaust gas-purifying catalyst that treats an exhaust gas of an automobile, a three-way catalyst with a precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. The inorganic oxide plays the roles in increasing the specific surface area of the precious metal and suppressing the sintering of the precious metal by dissipating heat generated by the reactions.

In recent years, occasions when an automotive vehicle such as an automobile is driven at high-speed increase as the performance of an engine increases. Additionally, in order to prevent the pollution of the air, the regulations on the exhaust gas are made more stringent. Against these backdrops, temperature of the exhaust gas emitted by the automotive vehicle is on the trend of rising. For that, in order to achieve the exhaust gas-purifying catalyst that exhibits sufficient performance even when used under such a condition, research and development are actively carried out.

For example, JP-A 1-242149 describes that alumina supporting a precious metal reacts with nickel at high temperatures to produce $NiAl_2O_4$ having a spinal structure when nickel is used in order to remove hydrogen sulfide from an exhaust gas. The Patent Literature describes that the reaction greatly deteriorates the activity of a catalyst. Furthermore, the Patent Literature describes that use of a composite oxide containing ceria and zirconia is effective for the suppression of the reaction.

JP-B 6-75675 describes that ceria causes grain growth when used at high temperatures, which leads to deterioration in oxygen storage capacity. The Patent Literature describes that a composite oxide represented by a general formula $Ce_{1-x}La_xO_{2-x/2}$ having a fluorite structure also causes grain growth when used at high temperatures, which leads to deterioration in purification performance. The Patent Literature further describes that a composite oxide or a solid solution of zirconia and ceria having an atomic ratio of zirconium to cerium within a range of 5/95 to 70/30 is less prone to cause grain growth even when used at high temperatures.

JP-A 10-202101 describes that a support in which alumina, ceria, and zirconia are uniformly distributed exhibits high heat resistance.

JP-A 2004-41866 describes a composite oxide having a perovskite structure represented by a general formula. $ABPdO_3$. In the general formula, the element A is at least one rare-earth element such as La, Nd, and Y having a valence of 3 and cannot have other valencies. The element. B is at least one element selected, from the group consisting of Al and transition elements other than Co, Pd, and rare-earth elements. The Patent Literature describes that the catalyst activity of palladium is maintained at a high level for a long period of time when the composite oxide is used.

JP-A 2004-41867 describes a composite oxide having a perovskite structure represented by a general formula $ABRhO_3$. In the general formula, the element A is at least one rare-earth element such as La, Nd, and Y having a valence of 3 and cannot have other valencies, or a combination of such a rare-earth element and at least one of Ce and Pr. The element B is at least one element selected from the group consisting of Al and transition elements other than Co, Rh, and rare-earth elements. The Patent Literature describes that the catalyst activity of rhodium is maintained at a high level for a long period of time when the composite oxide is used.

JP-A 2004-41868 describes a composite oxide having a perovskite structure represented by a general formula $A_{1-x}A'_xB_{1-y-z}B'_yPt_zO_3$. In the general formula, the element A is at least one rare-earth element such as La, Nd, and Y having a valence of 3 and cannot have other valencies. The element A' is at least one element selected from alkaline-earth metals and Ag. The element B is at least one element selected from Fe, Mn, and Al. The element. B' is at least one element selected from transition elements other than Pt, Fe, Mn, Co, and rare-earth elements. The Patent Literature describes that the catalyst activity of platinum is maintained at a high level for a long period of time when the composite oxide is used.

BRIEF SUMMARY OF THE INVENTION

An exhaust gas-purifying catalyst containing a precious metal such as palladium is prone to cause the sintering of the precious metal when, a fuel-rich high temperature exhaust gas is supplied.

Then, an object of the present invention is to provide an exhaust gas-purifying catalyst that less to cause deterioration in performance due to the sintering of a precious metal.

According to an aspect of the present invention, there is provided an exhaust gas-purifying catalyst comprising a support including a composite oxide having a composition represented by a general formula $AO.xB_{2-\alpha}C_\alpha O_3$, wherein A represents at least one of an element having a valence of 1 and an element having a valence of 2, B represents an element, having a valence of 3, C represents one or more elements selected from the group consisting of iridium, ruthenium, tantalum, niobium, molybdenum, and tungsten, x represents a numerical value within a range of 1 to 6, and $\alpha$ represents a numerical value greater than 0 and less than 2, and a catalytic metal supported by the subpart and including one or more precious metals selected from the group consisting of rhodium, palladium, and platinum. Examples of the composite oxide having the composition represented by the general formula include a composite oxide having oxygen vacancies.

The present invention provides an exhaust gas-purifying catalyst that is less prone to cause deterioration in performance due to the sintering of a precious metal.

DETAILED DESCRIPTION OF THE INVENTION

Embodiments of the present invention will be described in detail below with reference to the drawings. In the drawings, elements that are the same or similar in function are given the same reference characters, and their description will not be repeated.

Figure 1:
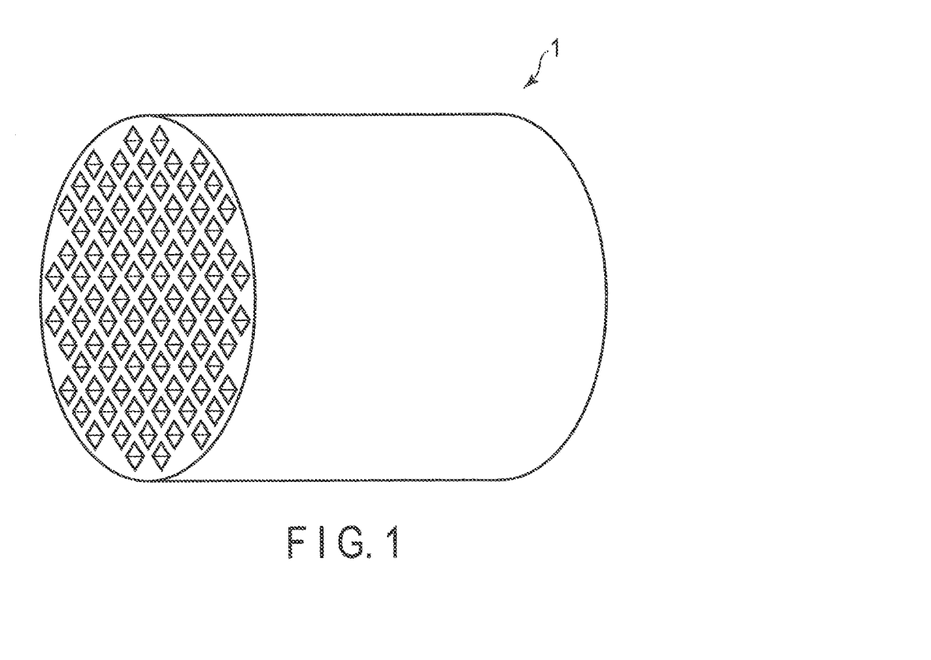
FIG. 1 is a perspective view schematically showing an exhaust gas-purifying catalyst according to an embodiment of the present invention.
Figure 2:
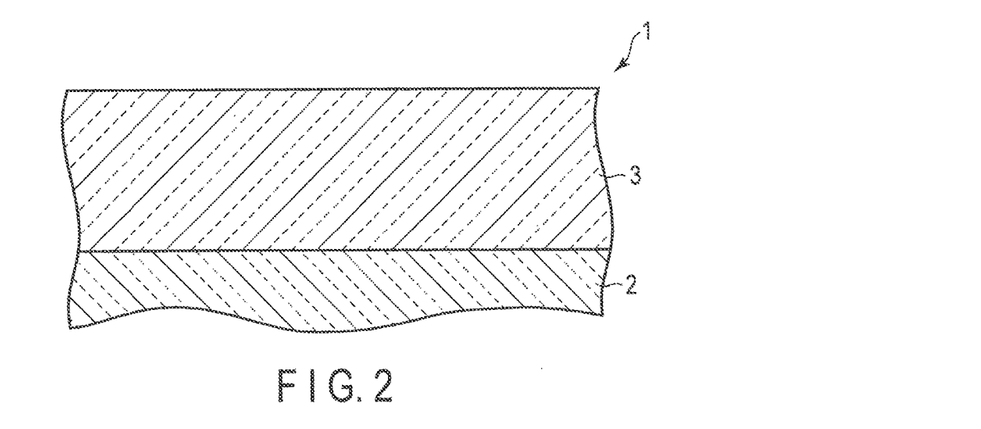
FIG. 2 is an enlarged cross-sectional view showing a part of the exhaust gas-purifying catalyst shown in FIG. 1.
Figure 3:
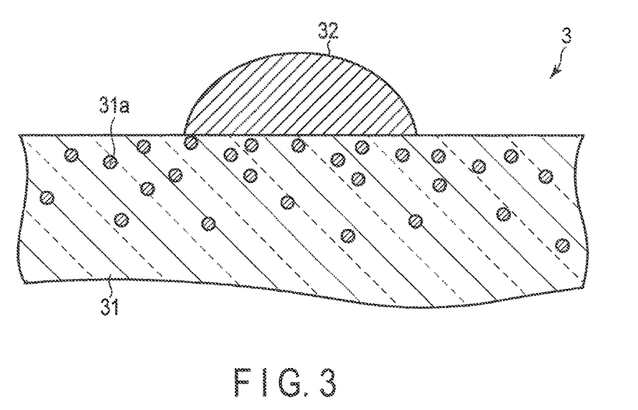
FIG. 3 is a cross-sectional view schematically showing a state of a catalyst layer of the exhaust gas-purifying catalyst shown in FIG. 1 in a fuel-lean high temperature atmosphere.
Figure 4:
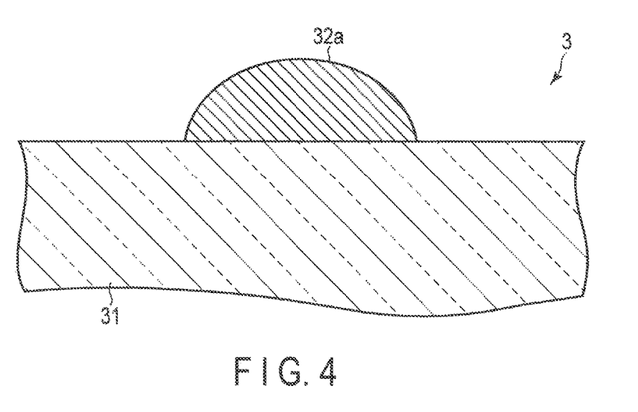
FIG. 4 is a cross-sectional view schematically showing a state of a catalyst layer of the exhaust gas-purifying catalyst shown in FIG. 1 in a fuel-rich high temperature atmosphere.

FIG. 1 is a perspective view schematically showing an exhaust gas-purifying catalyst according to an embodiment of the present invention. FIG. 2 is an enlarged cross sectional view showing a part of the exhaust gas-purifying catalyst shown in FIG. 1. FIG. 3 is a cross-sectional view schematically showing a state of a catalyst layer of the exhaust gas-purifying catalyst shown in FIG. 1 in a fuel-lean, high temperature atmosphere. FIG. 4 is a cross-sectional view schematically showing a state of a catalyst layer of the exhaust gas-purifying catalyst shown in FIG. 1 in a fuel-rich high temperature atmosphere.

An exhaust gas-purifying catalyst 1 shown in FIGS. 1 and 2 is a monolith catalyst. The exhaust gas-purifying catalyst 1 includes a substrate 2 such as a monolith honeycomb substrate. Typically, the substrate 2 is made of ceramic such as cordierite.

A catalyst layer 3 is formed on a partition wall of the substrate 2. The catalyst layer 3 contains a support 31 and a catalytic metal 32 that are shown in FIGS. 3 and 4.

The support 31 exists in the form of particles, for example. In this case, the average particle diameter of the support 31 is, for example, within a range of 0.5 to 100 μm, and typically within a range of 1 to 20 μm. The "average particle diameter" means a value obtained by the following method.

First, a part of the catalyst layer 3 is removed from the exhaust gas-purifying catalyst 1. Next, using a scanning electron microscope (SEM), an SEM image of this sample is taken at a 2,500 to 50,000-fold magnification. Twenty-five SEM images are taken. Then, the particles in full view are randomly selected from the supports 31 in the SEM images, and the area is obtained for each of the selected particles. Diameters of circles having the same areas as the above-described areas are calculated, and the arithmetic mean of the diameters is obtained. The arithmetic mean is stated as the average particle diameter. The standard deviation of the average particle diameter is, for example, 15 μm or less.

The support 31 plays the roles in increasing the specific surface area of the catalytic metal 32 and suppressing the sintering of the catalytic metal 32 by dissipating heat generated by the reactions. Another role of the support 31 will be described in detail later.

The support 31 includes a composite oxide having a composition represented by the following general formula:

$AO \cdot xB_{2-\alpha}C_{\alpha}O_3$

The composite oxide is a compound represented by a general formula $AO \cdot xB_{2-\alpha}C_{\alpha}O_3$, for example. Alternatively, the composite oxide is a mixture containing a plurality of compounds each represented by a general formula $AO \cdot xB_{2-\alpha}C_{\alpha}O_3$.

In the general formula, A represents at least one of an element having a valence of 1 and an element having a valence of 2. The element A is one or more elements selected from the group consisting of magnesium, calcium, strontium, and barium, for example. Typically, the element A is magnesium or a combination of magnesium and other element. In the latter case, the proportion of magnesium in the element A is, for example, 70 atomic % or more, and typically 85 atomic % or more. In this case, the proportion of magnesium in the element A is, for example, 99 atomic % or less, and typically 95 atomic % or less.

B represents an element having a valence of 3. The element B is at least one of aluminum and iron, for example. Typically, the element B is aluminum or a combination of aluminum and iron. In the latter case, the proportion of aluminum in the element B is, for example, 45 atomic % or more, and typically 70 atomic % or more. In this case, the proportion of aluminum in the element B is, for example, 99.9 atomic % or less, and typically 99.5 at atomic % or less.

C represents one or more elements selected from the group consisting of iridium, ruthenium, tantalum, niobium, molybdenum, and tungsten. The element C is iridium or a combination of iridium and other element, for example. In the latter case, the proportion of iridium in the element C is, for example, 30 atomic % or more, and more typically 50 atomic % or more. In this case, the proportion of iridium in the element C is, for example, 99 atomic % or less, and typically 95 atomic % or less.

$\alpha$ represents a numerical value greater than 0 and less than 2. $\alpha$ is, for example, within a range of 0.0004 to 0.2, typically within a range of 0.0004 to 0.11, and more typically within a range of 0.0085 to 0.095. When the composite oxide is a compound having the composition represented by the general formula, $\alpha$ satisfies the above conditions. When the composite oxide is a mixture containing a plurality of compounds each represented by the general formula, for example, $\alpha$ satisfies the above conditions in each of the compounds contained in the composite oxide. When $\alpha$ is increased, the effect of suppressing the sintering of the catalytic metal 32 is increased. It is however, generally difficult to manufacture a composite oxide having increased $\alpha$.

x represents a numerical, value within a range of 1 to 6. When the composite oxide is a compound having the composition represented by the general formula, x is 1 or 6, for example. When the composite oxide is a mixture containing a plurality of compounds each represented by the general formula, the composite oxide contains at least one of one or more compounds each represented by the general formula wherein x is 1 and one or more compounds each represented by the general formula wherein x is 6, for example. The compound represented by the general formula wherein x is 1 is a compound having a spinel structure, for example. On the other hand, the compound represented by the general formula wherein x is 6 is hexaaluminate, for example.

The above-mentioned compound may have oxygen vacancies. Similarly, examples of the composite oxide described herein include a compound having a smaller oxygen molar fraction in addition to the compounds represented by the general formula.

Typically, the support 31 further contains the element C, for example, the same element C as that contained in the composite oxide in the form of an elemental metal that is not solid-solutioned in the composite oxide in addition to the above-mentioned composite oxide. The ratio of the element C in the form of the elemental metal to the total amount of the element C contained in the exhaust gas-purifying catalyst 1 is, for example, 90 atomic % or less, and typically 70 atomic % or less. The ratio is, for example, 1 atomic % or more, and typically 5 atomic % or more.

The ratio of the amount of the element C contained in the composite oxide to the total amount of the element C contained in the exhaust gas-purifying catalyst 1 is, for example, 3 atomic % or more, typically 10 atomic % or more, and more typically 30 atomic % or more. The ratio is, for example, 99 atomic % or less, and typically 95 atomic or less.

The numerical value mentioned for the element C herein is a value obtained for the exhaust gas-purifying catalyst 1 immediately after being heated to high temperatures in an oxidizing atmosphere.

The catalytic metal 32 contains one or more precious metals. The precious metals are rhodium, palladium, platinum, or a combination thereof. In the exhaust gas purifying catalyst 1 immediately after heated to high temperatures in an oxidizing atmosphere, the precious metals exist as elemental metals, for example. At this time, at least a part of the precious metals may be oxidized (the oxidation number is increased). In the exhaust gas-purifying catalyst 1 immediately after heated to high temperatures in a reducing atmosphere, at least a part of the precious metals exist in the form of an alloy together with the element C.

The ratio of the mass of the precious metals contained in the catalytic metal 32 to the total of the mass of the support 31 and the mass of the catalytic metal 32 is, example, within a range of 0.01 to 10% by mass, and typically within a range of 0.1 to 5% by mass. When the mass ratio is decreased, the support 31 is required in a greater amount in order to achieve high exhaust gas purification performance, which causes an increase in the thermal capacity of the exhaust gas-purifying catalyst 1. The increased mass ratio is apt to cause the sintering of the catalytic metal 32.

The ratio of the mass of the catalytic metal 32 to the volumetric capacity of the exhaust gas-purifying catalyst 1 is, for example, within a range of 0.1 to 20 g/L, and typically within a range of 1 to 10 g/L. The decreased ratio makes it difficult to achieve high exhaust gas-purification performance. The increased ratio causes an increase in cost of raw materials far the exhaust gas-purifying catalyst 1.

The numerical values mentioned for the catalytic metal 32 herein are values obtained for the exhaust gas-purifying catalyst 1 immediately after heated to high temperatures in an oxidizing atmosphere.

The catalyst layer 3 can further contain other components. For example, the catalyst layer 3 may further contain an oxygen storage material.

The oxygen storage material stores oxygen under an oxygen-rich condition and emits oxygen under an oxygen-lean condition so as to optimize the oxidation reactions of HG and CO and the reductive reactions of $NO_x$. The oxygen storage material is in the form of particles, for example.

The oxygen storage material is, for example, ceria, a composite oxide of ceria with another metal oxide, or a mixture thereof. As the composite oxide, for example, a composite oxide of ceria and zirconia can be used.

The exhaust gas-purifying catalyst 1 provides a state change to be described later under high temperature conditions.

FIG. 3 shows a state of the catalyst layer 3 of the exhaust gas-purifying catalyst 1 when exposed to an atmosphere with a high oxygen concentration under high temperature conditions, for example, when the fuel supply to an engine is cut off. On the other hand, FIG. 4 shows a state of the catalyst layer 3 of the exhaust gas-purifying catalyst 1 when exposed to an atmosphere with a low oxygen concentration under high temperature conditions, for example, when an abundance of fuel is continuously supplied to an engine. Herein, the precious metal contained, in the catalytic metal 32 is supposed to be palladium, and the element C is supposed to be iridium in order to simplify the description thereof. In FIG. 3, reference character 31a represents iridium solid-solutioned in the support 31. In FIG. 4, reference character 32a represents an alloy containing palladium and iridium.

In the state shown in FIG. 3, palladium contained in the catalytic metal 32 exists as a simple metal, for example. In this state, at least a part of palladium may be oxidized.

When the oxygen concentration of the atmosphere is decreased under high temperature conditions, the catalyst layer 3 of the exhaust gas-purifying catalyst 1 changes from the state shown in FIG. 3 to the state shown in FIG. 4. Specifically, iridium is precipitated from the support 31, and at least a part of the precipitated iridium and palladium form an alloy.

When the oxygen concentration of the atmosphere is increased again under high temperature conditions, the catalyst layer 3 of the exhaust gas-purifying catalyst 1 changes from the state shown in FIG. 4 to the state shown in FIG. 3. Specifically, at least a part of iridium forming the alloy together with palladium is solid-solutioned in the support 31, and palladium changes from the alloy to a simple metal or its oxide. At least a part of iridium existing as a simple metal is also solid-solutioned in the support 31.

Thus, the catalyst layer 3 of the exhaust gas-purifying catalyst 1 reversibly changes with a change in the oxygen concentration of the atmosphere under high temperature conditions.

The melting point of the alloy containing iridium and palladium is higher than the melting point of palladium. Therefore, when the atmosphere is at high temperatures and the oxygen concentration thereof is low, the sintering of palladium is less prone to occur.

When the atmosphere is at high temperatures and the oxygen concentration thereof is high, iridium may volatilize as iridium oxide. However, when the oxygen concentration of the atmosphere under high temperature conditions is increased, iridium is solid-solutioned in the support 31. The composite oxide containing iridium is less prone to volatilize as compared with iridium oxide. Therefore, the exhaust gas-purifying catalyst 1 is less prone to cause the volatilization of iridium.

As apparent from the above description, the sintering of the precious metals contained in the catalytic metal 32 can be suppressed for a long period of time by adopting the above-mentioned configuration. That is, the exhaust gas-purifying catalyst 1 is less prone to cause deterioration in performance due to the sintering of the precious metals.

The exhaust gas-purifying catalyst 1 is manufactured by the following method, for example.

First, a support 31 is prepared. The support 31 is prepared by the following method, for example. That is, coprecipitation is produced in an aqueous solution containing a salt of an element A and a salt of an element B. Then, the aqueous solution is stirred, for example, at a temperature of 40 to 70° C. for 30 to 120 minutes, and an aqueous solution containing a salt of an element C is then added to the stirred aqueous solution to further produce coprecipitation in the mixed solution. Then, the coprecipitate thus obtained is dried, and fired in an oxidizing atmosphere. A firing temperature is set to be within a range of 500 to 1000° C., for example. The support 31 is thus obtained.

Next, the support 31 is dispersed in deionized water to produce a fluid dispersion. Subsequently, a solution containing a salt of at least one precious metal of rhodium, palladium, and platinum is added to the fluid dispersion, to allow the support 31 to adsorb the precious metal. Then, this is dried, and fired in an oxidizing atmosphere. A firing temperature is set within a range of about 250° C. to about 500° C., for example. As above, a supported catalyst containing the support 31 and a catalytic metal 32 supported by the support 31 is obtained.

Then, a slurry containing the supported catalyst is prepared. Another component, for example, an oxygen storage material is added to the slurry, if necessary. Then, the substrate 2 is coated with the slurry to produce a coated film, and the coated film is dried and fired. As above, an exhaust gas-purifying catalyst 1 is completed.

In the exhaust gas-purifying catalyst 1 described herein, the catalyst layer 3 has a single layer structure, but the catalyst layer 3 may have a multilayer structure. The monolith catalyst has been described, herein, but the above-mentioned technique can also be applied, to a pellet catalyst.

Hereinafter, examples of the present invention will be described.

<Manufacture of Catalyst C1>

An exhaust gas-purifying catalyst was manufactured by the following method.

First, a magnesium acetate aqueous solution containing 0.1 mol of magnesium, an aluminum nitrate aqueous solution containing 0.195 mol of aluminum, and an iron nitrate aqueous solution containing 0.004 mol of iron were added to 500 mL of deionized water to produce a mixed solution, and the mixed solution was stirred. Then, an aqueous solution containing potassium hydroxide at the concentration of 20% by mass was added to the mixed solution until the pH of the mixed solution reached 10 at room temperature so as to cause coprecipitation.

The aqueous solution was stirred at 50° C. for 60 minutes, and an iridium nitrate aqueous solution containing 0.001 mol of iridium was then added to the stirred aqueous solution to produce a mixed aqueous solution. Then, an aqueous solution containing potassium hydroxide at the concentration of 20% by mass was added to the mixed aqueous solution until the pH of the mixed aqueous solution reached 12 at room temperature so as to cause coprecipitation.

Then, the solution was filtrated to obtain a filter cake, and the filter cake was washed with pure water. Subsequently, this was dried at 110° C., and fired in the atmosphere at 1000° C. for 1 hour. As above, a powdery support was obtained.

A part of the powder was taken, and immersed for 12 hours in a 20% hydrogen fluoride aqueous solution held at room temperature. Note that this condition allowed only the composite oxide of the above powder to be dissolved. Subsequently, the solution was filtrated to a produce a filtrate, and the filtrate was subjected to inductively coupled plasma (ICP) spectrometry. As a result, the iridium content of the filtrate revealed that 86% of iridium formed the solid solution, that is, the solid solution-forming ratio was 86%.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 1% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C1".

<Manufacture of Catalyst C2>

A pellet catalyst was manufactured by the same method as that described above for the catalyst C1 except that firing for obtaining a support was performed at 900° C. instead of 1000° C. Hereinafter, the pellet catalyst is referred to as a "catalyst C2".

In the manufacture of the catalyst C2, the solid solution-forming ratio of iridium was measured by the same method as that performed in the manufacture or the catalyst C. As a result, the solid solution-forming ratio was 63%.

<Manufacture of Catalyst C3>

A pellet catalyst was manufactured by the same method as that described above for the catalyst C1 except that firing for obtaining a support was performed at 800° C. instead of 1000° C. Hereinafter, the pellet catalyst is referred to as a "catalyst C3.".

In the manufacture of the catalyst C3, the solid solution-forming ratio of iridium was measured by the same method as that performed in the manufacture of the catalyst C1. As a result, the solid solution-forming ratio was 49%.

<Manufacture of Catalyst C4>

A pellet catalyst was manufactured by the same method as that described above for the catalyst C1 except that firing for obtaining a support was performed at 700° C. instead of 1000° C. Hereinafter, the pellet catalyst is referred to as a "catalyst C4".

In the manufacture of the catalyst C4, the solid solution-forming ratio of iridium was measured by the same method as that performed in the manufacture of the catalyst C1. As a result, the solid solution-forming ratio was 29%.

<Manufacture of Catalyst C5>

A pellet catalyst was manufactured by the same method as that described above for the catalyst C1 except that firing for obtaining a support was performed at 600° C. instead of 1000° C. Hereinafter, the pellet catalyst is referred to as a "catalyst C5".

In the manufacture of the catalyst C5, the solid solution-forming ratio of iridium was measured by the same method as that performed in the manufacture of the catalyst C1. As a result, the solid solution-forming ratio was 10%.

<Manufacture of Catalyst C6>

A pellet catalyst was manufactured by the same method as that described above for the catalyst C1 except that firing for obtaining a support was performed at 500° C. instead of 1000° C. Hereinafter, the pellet catalyst is referred to as a "catalyst C6".

In the manufacture of the catalyst C6, the solid solution-forming ratio of iridium was measured by the same method as that performed in the manufacture of the catalyst C1. As a result, the solid solution-forming ratio was 3%.

<Manufacture of Catalyst C7>

An exhaust gas-purifying catalyst was manufactured by the following method.

First, a magnesium acetate aqueous solution containing 0.1 mol of magnesium, an aluminum nitrate aqueous solution containing 0.196 mol of aluminum, and an iron nitrate aqueous solution containing 0.004 mol of iron were added to 500 mL of deionized water to produce a mixed solution, and the mixed solution was stirred. Then, an aqueous solution containing potassium hydroxide at the concentration of 20% by mass was added to the mixed solution until the pH of the mixed solution reached 10 at room temperature, so as to cause coprecipitation.

Then, the solution was filtrated to obtain a filter cake, and the filter cake was washed with pure water. Subsequently, this was dried at 110° C., and fired in the atmosphere at 1000° C. for 1 hour. As above, a powdery support was obtained.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 1% by mass.

Then, the slurry was Filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C7".

<Manufacture of Catalyst C8>

A pellet catalyst was manufactured by the same method as that described above for the catalyst C1 except that an aluminum nitrate aqueous solution containing 0.19595 mol of aluminum and an iridium nitrate aqueous solution containing 0.00005 mol of iridium were respectively used instead of an aluminum nitrate aqueous solution containing 0.195 mol of aluminum and an iridium nitrate aqueous solution containing 0001 mol of iridium. Hereinafter, the pellet catalyst is referred to as a "catalyst C8".

In the manufacture of the catalyst C8, the solid solution-forming ratio of iridium was measured by the same method as that performed in the manufacture of the catalyst C1. As a result, the solid solution-forming ratio was 87%.

<Manufacture of Catalyst C9>

A pellet catalyst was manufactured by the same method as that described above for the catalyst C1 except that an aluminum nitrate aqueous solution containing 0.1959 mol of aluminum and an iridium nitrate aqueous solution containing 0.0001 mol of iridium were respectively used instead of an aluminum nitrate aqueous solution containing 0.195 mol of aluminum and an iridium nitrate aqueous solution containing 0.001 mol of iridium. Hereinafter, the pellet catalyst is referred to as a "catalyst C9".

Also in the manufacture of the catalyst C9, the solid solution-forming ratio of iridium was measured by the same method as that performed an the manufacture of the catalyst C1. As a result, the solid solution-forming ratio was 85%.

<Manufacture of Catalyst C10>

A pellet catalyst was manufactured by the same method as that described above for the catalyst C1 except that an aluminum nitrate aqueous solution containing 0.186 mol of aluminum and an iridium nitrate aqueous solution containing 0.01 mol of iridium were respectively used instead of an aluminum nitrate aqueous solution containing 0.195 mol of aluminum and an iridium nitrate aqueous solution containing 0.001 mol of iridium. Hereinafter, the pellet catalyst is referred to as a "catalyst C10".

In the manufacture of the catalyst C10, the solid solution-forming ratio of iridium was measured by the same method as that performed in the manufacture of the catalyst C1. As a result, the solid solution-forming ratio was 68%.

<Manufacture of Catalyst C11>

A pellet catalyst was manufactured by the same method as that described above for the catalyst C1 except that an aluminum nitrate aqueous solution containing 0.146 mol of aluminum and an iridium nitrate aqueous solution containing 0.05 mol of iridium were respectively used instead of an aluminum nitrate aqueous solution containing 0.195 mol of aluminum and an iridium nitrate aqueous solution containing 0.001 mol of iridium. Hereinafter, the pellet catalyst is referred to as a "catalyst C11".

In the manufacture of the catalyst C11, the solid solution-forming ratio of iridium was measured by the same method as that performed in the manufacture of the catalyst C1. As a result, the solid solution-forming ratio was 19%.

<Manufacture of Catalyst C12>

A pellet catalyst was manufactured by the same method as that described above for the catalyst C1 except that an aluminum nitrate aqueous solution containing 0.096 mol of aluminum and an iridium nitrate aqueous solution containing 0.1 mol of iridium were respectively used instead of an aluminum nitrate aqueous solution containing 0.195 mol of aluminum and an iridium nitrate aqueous solution containing 0.001 mol of iridium. Hereinafter, the pellet catalyst is referred to as a "catalyst C12".

Also in the manufacture of the catalyst C12, the solid solution-forming ratio of iridium was measured by the same method as that performed in the manufacture of the catalyst C1. As a result, the solid solution-forming ratio was 11%.

<Manufacture of Catalyst C13>

A pellet catalyst was manufactured by the same method as that described above for the catalyst C1 except that an aluminum nitrate aqueous solution containing 1.17 mol of aluminum, an iron nitrate aqueous solution containing 0.024 mol of iron, and an iridium nitrate aqueous solution containing 0.006 mol of iridium were respectively used instead of an aluminum nitrate aqueous solution containing 0.195 mol of aluminum, an iron nitrate aqueous solution containing 0.004 mol of iron, and an iridium nitrate aqueous solution containing 0.001 mol of iridium. Hereinafter, the pellet catalyst is referred to as a "catalyst C13".

Also in the manufacture of the catalyst C13, the solid solution-forming ratio of iridium was measured by the same method as that performed in the manufacture of the catalyst C1. As a result, the solid solution-forming ratio was 86%.

<Manufacture of Catalyst C14>

An exhaust gas-purifying catalyst was manufactured by the following method.

First, a magnesium acetate aqueous solution containing 0.1 mol of magnesium and an aluminum nitrate aqueous solution containing 0.199 mol of aluminum were added to 500 mL of deionized water to produce a mixed solution, and the mixed solution was stirred. Then, an aqueous solution containing potassium hydroxide at the concentration of 20% by mass was added to the mixed solution until the pH of the mixed solution reached 10 at room temperature, so as to cause coprecipitation.

The aqueous solution was stirred at 50° C. for 60 minutes, and an iridium nitrate aqueous solution containing 0.001 mol of iridium was then added to the stirred aqueous solution to produce a mixed aqueous solution. Then, an aqueous solution containing potassium hydroxide at the concentration of 20% by mass was added to the mixed aqueous solution until the pH of the mixed aqueous solution was set to 12 at room temperature, so as to cause coprecipitation.

Then, the solution was filtrated to obtain a filter cake, and the filter cake was washed with pure water. Subsequently, this was dried at 110° C., and fired in the atmosphere at 1000° C. for 1 hour. As above, a powdery support was obtained.

A part of the powder was taken, and the solid solution-forming ratio of iridium was measured by the same method as that performed in the manufacture of the catalyst C1. As a result, the solid solution-forming ratio of was 80%.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 1% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C14".

<Manufacture of Catalyst C15>

A pellet catalyst was manufactured by the same method as that described above for the catalyst C1 except that a calcium acetate aqueous solution containing 0.1 mol of calcium was used instead of a magnesium acetate aqueous solution containing 0.1 mol of magnesium. Hereinafter, the pellet catalyst is referred to as a "catalyst C15".

In the manufacture of the catalyst C15 the solid solution-forming ratio of iridium was measured by the same method as that performed in the manufacture of the catalyst C1. As a result, the solid solution-forming ratio was 77%.

<Manufacture of Catalyst C16>

A pellet catalyst was manufactured by the same method as that described above for, the catalyst C1 except that a strontium acetate aqueous solution containing 0.1 mol of strontium was used instead of a magnesium acetate aqueous solution containing 0.1 mol of magnesium. Hereinafter, the pellet catalyst is referred to as a "catalyst C16".

In the manufacture of the catalyst C16, the solid solution-forming ratio of iridium was measured by the same method as that performed in the manufacture of the catalyst C1. As a result, the solid solution-forming ratio was 53%.

<Manufacture of Catalyst C17>

A pellet catalyst was manufactured by the same method as that described above for the catalyst C1 except that a barium acetate aqueous solution containing 0.1 mol of barium was used instead of a magnesium acetate aqueous solution containing 0.1 mol of magnesium. Hereinafter, the pellet catalyst is referred to as a "catalyst C17".

In the manufacture of the catalyst C17, the solid solution-forming ratio of iridium was measured by the same method as that performed in the manufacture of the catalyst C1. As a result, the solid solution-forming ratio was 37%.

<Manufacture of Catalyst C18>

A pellet catalyst was manufactured by the same method as that described above for the catalyst C14 except that a ruthenium acetate aqueous solution containing 0.001 mol of ruthenium was used instead of an iridium nitrate aqueous solution containing 0.001 mol of iridium. Hereinafter, the pellet catalyst is referred to as a "catalyst C18".

In the manufacture of the catalyst C18, the solid solution-forming ratio of ruthenium was measured by the same method as that in the measurement of the solid solution-forming ratio of iridium performed in the manufacture of the catalyst C1. As a result, the solid solution-forming ratio was 81%.

<Manufacture of Catalyst C19>

A pellet catalyst was manufactured by the same method as that described above for the catalyst C14 except that a tantalum-n-butoxide solution containing 0.001 mol of tantalum was used instead of an iridium nitrate aqueous solution containing 0.001 mol of iridium. Hereinafter, the pellet catalyst is referred to as a "catalyst C19".

In the manufacture of the catalyst C19, the solid solution-forming ratio of tantalum was measured by the same method as that in the measurement of the solid solution-forming ratio of iridium performed in the manufacture of the catalyst C1. As a result, the solid solution-forming ratio was 64%.

<Manufacture of Catalyst C20>

A pellet catalyst was manufactured by the same method as that described above for the catalyst C14 except that a pentaethoxy niobium solution containing 0.001 mol of niobium was used instead of an iridium nitrate aqueous solution containing 0.001 mol of iridium. Hereinafter, the pellet catalyst is referred to as a "catalyst C20".

In the manufacture of the catalyst C20, the solid solution-forming ratio of niobium was measured by the same method as that in the measurement of the solid solution-forming ratio of iridium performed in the manufacture of the catalyst C1. As a result, the solid solution-forming ratio was 44%.

<Manufacture of Catalyst C21>

A pellet catalyst was manufactured by the same method as that described above for the catalyst C14 except that a hexaammonium heptamolybdate solution containing 0.001 mol of molybdenum was used instead of an iridium nitrate aqueous solution containing 0.001 mol of iridium. Hereinafter, the pellet catalyst is referred to as a "catalyst C21".

In the manufacture of the catalyst C21, the solid solution-forming ratio of molybdenum was measured by the same method as that in the measurement of the solid solution-forming ratio of iridium performed in the manufacture of the catalyst C1. As a result, the solid solution-forming ratio was 40%.

<Manufacture of Catalyst C22>

A pellet catalyst was manufactured by the same method as that described above for the catalyst C14 except that an ammonium tungstate solution containing 0.001 mol of tungsten was used instead of an iridium nitrate aqueous solution containing 0.001 mol of iridium. Hereinafter, the pellet catalyst is referred to as a "catalyst C22".

In the manufacture of the catalyst C22, the solid solution-forming ratio of tungsten was measured by the same method as that in the measurement of the solid solution-forming ratio of iridium performed in the manufacture of the catalyst C1. As a result, the solid solution-forming ratio was 38%.

<Manufacture of Catalyst C23>

A pellet catalyst was manufactured by the same method as that described above for the catalyst C14 except that a dinitrodiamine platinum nitrate solution containing 0.001 mol of platinum was used instead of an iridium nitrate aqueous solution containing 0.001 mol of iridium. Hereinafter, the pellet catalyst is referred to as a "catalyst C23".

In the manufacture of the catalyst C23, the solid solution-forming ratio of platinum was measured by the same method as that in the measurement of the solid solution-forming ratio of iridium performed in the manufacture of the catalyst C1. As a result, the solid solution-forming ratio was 4%.

<Manufacture of Catalyst C24>

A pellet catalyst was manufactured by the same method as that described above for the catalyst C1 except that a dinitrodiamine platinum nitrate solution was used instead of a palladium nitrate aqueous solution. Hereinafter, the pellet catalyst is referred to as a "catalyst C24".

Also in the manufacture of the catalyst C24, the solid solution-forming ratio of iridium was measured by the same method as that performed in the manufacture of the catalyst C1. As a result, the solid solution-forming ratio was 86%.

<Manufacture of Catalyst C25>

A pellet catalyst was manufactured by the same method as that described above for the catalyst C1 except that a rhodium nitrate aqueous solution was used instead of a palladium nitrate aqueous solution. Hereinafter, the pellet catalyst is referred to as a "catalyst C25".

In the manufacture of the catalyst C25, the solid solution-forming ratio of iridium was measured by the same method as that performed in the manufacture of the catalyst C1. As a result, the solid solution-forming ratio was 86%.

<Manufacture of Catalyst C26>

An exhaust gas-purifying catalyst was manufactured by the following method.

First, commercially available γ-alumina powder was added to 500 mL of deionized water. The specific surface area of the alumina powder used herein was 150 m²/g. After the alumina powder was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 1% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C26".

<Manufacture of Catalyst C27>

A pellet catalyst was manufactured by the same method as that described above for the catalyst C26 except that a dinitrodiamine platinum nitrate solution was used instead of a palladium nitrate aqueous solution. Hereinafter, the pellet catalyst is referred to as a "catalyst C27".

<Manufacture of Catalyst C28>

A pellet catalyst was manufactured by the same method as that described above for the catalyst C26 except that a rhodium nitrate aqueous solution was used instead of a palladium nitrate aqueous solution. Hereinafter, the pellet catalyst is referred to as a "catalyst C28".

<Manufacture a Catalyst C29>

A pellet catalyst was manufactured by the same method as that described above for the catalyst C1 except that stirring at 50° C. for 60 minutes was omitted in the preparation of a support. Hereinafter, the pellet catalyst is referred to as a "catalyst C29".

In the manufacture of the catalyst C29, the solid solution-forming ratio of iridium was measured by the same method as that performed in the manufacture of the catalyst C1. As a result, the solid solution-forming ratio was 2%.

<Manufacture of Catalyst C30>

0.100 mol of magnesium methoxypropylate and 0.096 mol of titanium isopropoxide were added to a round-bottom flask having a volume of 500 mL, and 200 mL of toluene was further added to the flask to produce a mixed solution. The mixed solution was stirred to dissolve the magnesium methoxyropylate and the titanium isopropoxide. 200 mL of deionized water was dropped into the obtained mixed alkoxide solution to perform a hydrolysis reaction, thereby producing a viscous precipitate. The toluene was distilled off from the mixed alkoxide solution containing the viscous precipitate, to obtain a slurry. Then, an iridium nitrate aqueous solution (iridium content: 0.004 mol) was added to the slurry, followed by stirring at room temperature for 1 hour. Then, water was distilled off from the obtained mixed solution under reduced pressure, to dry the mixed solution. The obtained dried product was fired in the atmosphere at 950° C. for 2 hours. As above, a powdery support was obtained.

A part of the powder was taken, and the solid solution-forming ratio of iridium was measured by the same method as that performed in the manufacture of the catalyst C1. As a result, the solid solution-forming ratio was 88%.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 1% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. The X-ray diffraction confirmed that the composite oxide contained in the support of the pellet catalyst had an ilmenite structure. Hereinafter, the pellet catalyst is referred to as a "catalyst C30".

<Evaluation>

The endurance of the catalysts C1 to C30 was tested by the following method.

First, each of the catalysts C1 to C30 was set in a flow-type endurance test apparatus, and a gas containing nitrogen as a main component was made to flow through a catalyst bed at the flow rate of 500 mL/minute for 30 hours. During this period, the temperature of the catalyst bed was held at 950° C. As the gas made to flow through the catalyst bed, a lean gas and a rich gas were used, and these gases were switched at intervals of 5 minutes. Note that the lean gas was a gas prepared by adding oxygen to nitrogen at the concentration of 3%, while the rich gas was a gas prepared by adding carbon monoxide to nitrogen at the concentration of 9%.

Then, each of the catalysts C1 to C30 was set in an atmospheric fixed bed flow reactor. Then, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, a gas containing equivalent amounts of oxidizing components (oxygen and nitrogen oxides) and reducing components (carbon monoxide, hydrocarbons, and hydrogen), which were adjusted stoichiometrically, was used. The results were shown in the following Tables 1 to 3.

TABLE 1

| Catalyst | Catalytic metal Element | Amount (mass %) | Final product composition | Support Crystal structure | Solid solution-forming ratio (%) | 50% purification temperature (° C.) HC | 50% purification temperature (° C.) NOx |
|---|---|---|---|---|---|---|---|
| C1 | Pd | 1 | $MgAl_{1.95}Fe_{0.04}Ir_{0.0086}O_4$ | Spinel | 86 | 342 | 330 |
| C2 | Pd | 1 | $MgAl_{1.95}Fe_{0.04}Ir_{0.0063}O_4$ | Spinel | 63 | 339 | 331 |
| C3 | Pd | 1 | $MgAl_{1.95}Fe_{0.04}Ir_{0.0049}O_4$ | Spinel | 49 | 353 | 344 |
| C4 | Pd | 1 | $MgAl_{1.95}Fe_{0.04}Ir_{0.0029}O_4$ | Spinel | 29 | 365 | 355 |
| C5 | Pd | 1 | $MgAl_{1.95}Fe_{0.04}Ir_{0.001}O_4$ | Spinel | 10 | 388 | 380 |
| C6 | Pd | 1 | $MgAl_{1.95}Fe_{0.04}Ir_{0.0003}O_4$ | Spinel | 3 | 414 | 408 |
| C7 | Pd | 1 | $MgAl_{1.96}Fe_{0.04}O_4$ | Spinel | — | 423 | 419 |
| C8 | Pd | 1 | $MgAl_{1.9595}Fe_{0.04}Ir_{0.000435}O_4$ | Spinel | 87 | 385 | 379 |
| C9 | Pd | 1 | $MgAl_{1.959}Fe_{0.04}Ir_{0.00085}O_4$ | Spinel | 85 | 367 | 358 |
| C10 | Pd | 1 | $MgAl_{1.86}Fe_{0.04}Ir_{0.068}O_4$ | Spinel | 68 | 350 | 337 |

TABLE 2

| Catalyst | Catalytic metal Element | Amount (mass %) | Final product composition | Support Crystal structure | Solid solution-forming ratio (%) | 50% purification temperature (° C.) HC | 50% purification temperature (° C.) $NO_x$ |
|---|---|---|---|---|---|---|---|
| C11 | Pd | 1 | $MgAl_{1.46}Fe_{0.04}Ir_{0.095}O_4$ | Spinel | 19 | 364 | 353 |
| C12 | Pd | 1 | $MgAl_{0.96}Fe_{0.04}Ir_{0.11}O_4$ | Spinel | 11 | 385 | 376 |
| C13 | Pd | 1 | $MgAl_{11.7}Fe_{0.24}Ir_{0.0516}O_{19}$ | Hexaaluminate | 86 | 343 | 330 |
| C14 | Pd | 1 | $MgAl_{1.99}Ir_{0.008}O_4$ | Spinel | 80 | 347 | 339 |
| C15 | Pd | 1 | $CaAl_{1.95}Fe_{0.04}Ir_{0.0077}O_4$ | Spinel | 77 | 354 | 345 |
| C16 | Pd | 1 | $SrAl_{1.95}Fe_{0.04}Ir_{0.0053}O_4$ | Spinel | 53 | 361 | 353 |
| C17 | Pd | 1 | $BaAl_{1.95}Fe_{0.04}Ir_{0.0037}O_4$ | Spinel | 37 | 366 | 356 |
| C18 | Pd | 1 | $MgAl_{1.99}Ru_{0.0081}O_4$ | Spinel | 81 | 346 | 338 |
| C19 | Pd | 1 | $MgAl_{1.99}Ta_{0.0064}O_4$ | Spinel | 64 | 363 | 354 |
| C20 | Pd | 1 | $MgAl_{1.99}Nb_{0.0044}O_4$ | Spinel | 44 | 369 | 358 |

TABLE 3

| Catalyst | Catalytic metal Element | Amount (mass %) | Support Final product composition | Crystal structure | Solid solution-forming ratio (%) | 50% purification temperature (° C.) HC | NO$_x$ |
|---|---|---|---|---|---|---|---|
| C21 | Pd | 1 | $MgAl_{1.99}Mo_{0.004}O_4$ | Spinel | 40 | 372 | 362 |
| C22 | Pd | 1 | $MgAl_{1.99}W_{0.0038}O_4$ | Spinel | 38 | 375 | 364 |
| C23 | Pd | 1 | $MgAl_{1.99}Pt_{0.0004}O_4$ | Spinel | 4 | 404 | 395 |
| C24 | Pt | 1 | $MgAl_{1.95}Fe_{0.04}Ir_{0.0086}O_4$ | Spinel | 86 | 356 | 365 |
| C25 | Rh | 1 | $MgAl_{1.95}Fe_{0.04}Ir_{0.0086}O_4$ | Spinel | 86 | 292 | 283 |
| C26 | Pd | 1 | $Al_2O_3$ | γ | — | 428 | 423 |
| C27 | Pt | 1 | $Al_2O_3$ | γ | — | 440 | 457 |
| C28 | Rh | 1 | $Al_2O_3$ | γ | — | 393 | 385 |
| C29 | Pd | 1 | $MgAl_{1.95}Fe_{0.04}Ir_{0.0002}O_4$ | Spinel | 2 | 420 | 414 |
| C30 | Pd | 1 | $MgTi_{0.96}Ir_{0.0352}O_3$ | Ilmenite | 88 | 421 | 416 |

In Tables 1 to the "final product composition" of the "support" is a composition obtained from the atomic ratios of elements specified by elemental analysis, and a crystal structure specified using X-ray diffraction. Herein, oxygen vacancies are disregarded. Regarding the atomic ratios of the elements other than Ir, since the values of added amounts (charged amounts) in the manufacture can be presumed to be equal to actual values, the values of the charged amounts were presumed as the actual values of the final product.

In Tables 1 to 3, the column denoted by "50% purification temperature" shows the lowest temperature of the catalyst bed at which 50% or more of each component contained in the model gas was purified. The columns denoted by "HC" and "NO$_x$" show the data for hydrocarbons and nitrogen oxides, respectively.

Figure 5:
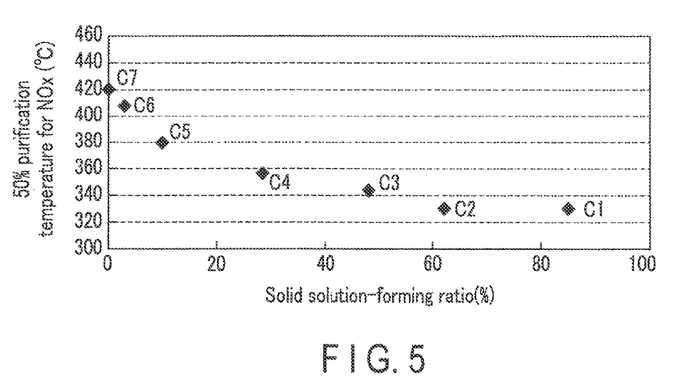
FIG. 5 is a graph showing an example of influence that the composition of a support exerts on the performance of an exhaust gas-purifying catalyst.

FIG. 5 is a graph showing an example of influence that the composition of the support exerts on the performance of the exhaust gas-purifying catalyst. The data obtained for the catalysts C1 to C7 are shown in FIG. 5. In FIG. 5, the abscissa represents the solid solution-forming ratio of iridium, and the ordinate represents the 50% purification temperature for NO$_x$.

Figure 6:
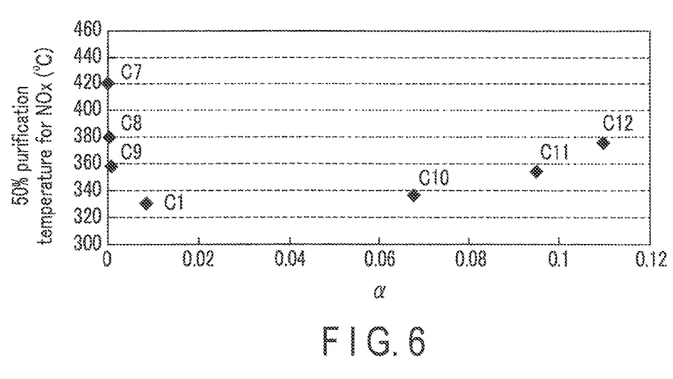
FIG. 6 is a graph showing another example of influence that the composition of a support exerts on the performance of an exhaust gas-purifying catalyst.

FIG. 6 is a graph showing another example of influence that the composition of the support exerts on the performance of the exhaust gas-purifying catalyst. The data obtained for the catalyst C1 and C7 to C12 are shown in FIG. 6. In FIG. 6, the abscissa represents α in the general formula, and the ordinate represents the 50% purification temperature for NO$_x$.

As shown in Tables 1 to 3 and FIG. 5, in the case where the composite oxide contained in the support had a spinel structure or a hexaaluminate structure, and at least a part of iridium was solid-solutioned in the support, higher exhaust gas-purification performance could be achieved as compared with the case where the composite oxide contained in the support had an ilmenite structure or the case where iridium was not solid-solutioned in the support at all. In the case where the solid solution-forming ratio of iridium was 10% or more, particularly excellent exhaust gas-purification performance could be achieved. In the case where the solid solution-forming ratio of iridium was 30% or more, the most excellent exhaust gas-purification performance could be achieved.

As shown in Tables 1 to 3 and FIG. 6, in the case where α was more than 0, higher exhaust gas-purification performance could be achieved as compared with the case where α was 0. In the case where α was within a range of 0.0004 to 0.11, particularly excellent exhaust gas-purification performance could be achieved. In the case where α was in a range of 0.0085 to 0.095, the most exhaust gas-purification performance could be achieved.

The method of manufacturing the catalyst C29 is different from the method for manufacturing the catalyst C1 only in that stirring at 50° C. for 60 minutes is omitted in preparation of the support. However, the catalyst C29 has a remarkably lower solid solution-forming ratio of iridium than that of the catalyst C1. This shows that a heat treatment performed immediately after a first coprecipitation process exerts large influence on the solid solution-forming ratio of iridium.

When the data obtained for the catalysts C14 and C18 to C22 are compared, the catalysts C14 and C18 achieve more excellent performance than those of the catalysts C19 to C22. One of the reasons is considered to be that iridium and ruthenium achieve a higher solid solution-forming ratio than those of tantalum, niobium, molybdenum, and tungsten, and are thus less prone to cause evaporation. Another reason is considered to be that iridium and ruthenium are likely to form an alloy together with rhodium, palladium, and platinum as compared with tantalum, niobium, molybdenum, and tungsten, and have a large effect of suppressing the sintering of the alloys.

<Analysis>

Each of the catalysts C1 and C26 was set in a flow-type endurance test apparatus, and a gas containing nitrogen as a main component was made to flow through a catalyst bed at the flow rate of 500 mL/minute for 30 hours. During this period, the temperature of the catalyst bed was held at 950° C. As the gas made to flow through the catalyst bed, a lean as and a rich gas were used, and these gases were switched at intervals of 5 minutes. Note that the lean as was a gas prepared by adding oxygen to nitrogen at the concentration of 3%, while the rich gas was a gas prepared by adding carbon monoxide to nitrogen at the concentration of 9%. The endurance test was performed such that the rich gas was finally made to flow through the catalyst bed.

After the endurance test, the catalyst layer of each of the catalysts C1 and C26 was observed by FE-SEM (field emission-scanning electron microscope).

Figure 7:
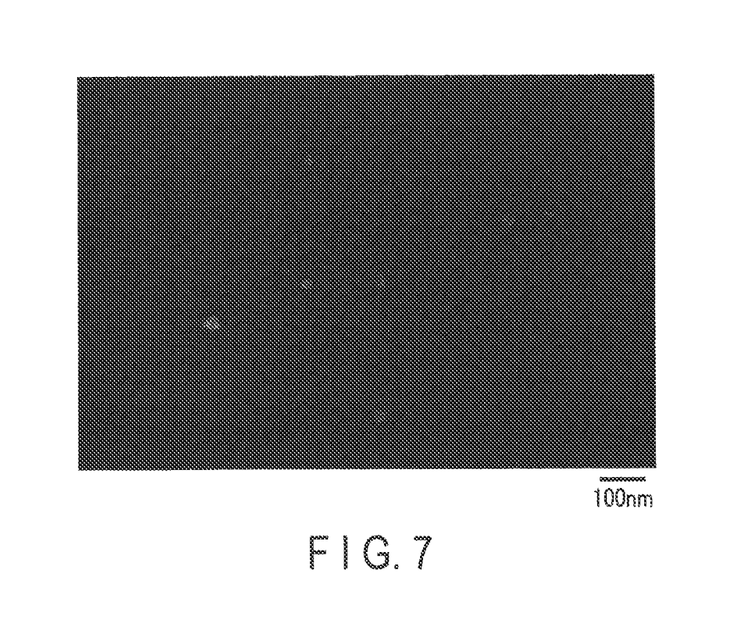
FIG. 7 is an electron microscope photograph of a catalyst layer obtained for a catalyst C1 after an endurance test.
Figure 8:
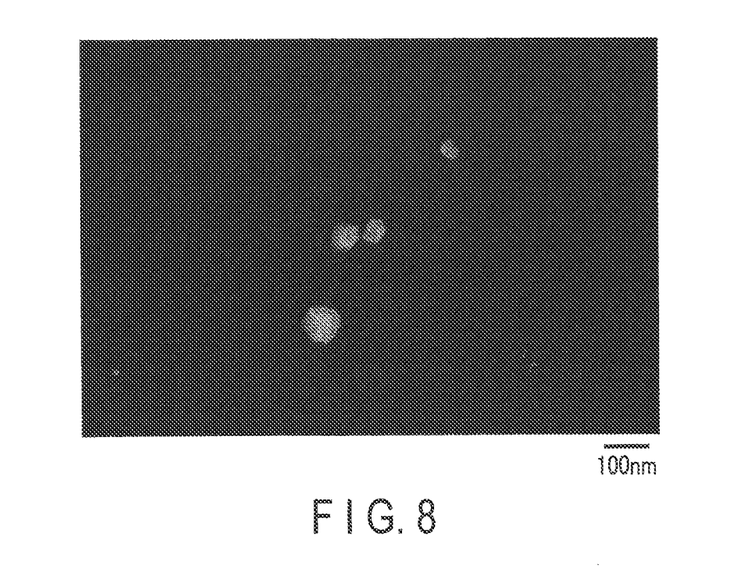
FIG. 8 is an electron microscope photograph of a catalyst layer obtained for a catalyst C26 after an endurance test.

FIG. 7 is an electron microscope photograph of the catalyst layer obtained for the catalyst C1 after the endurance test. FIG. 8 is an electron microscope photograph of the catalyst layer obtained for the catalyst C26 after the endurance test.

As shown in FIG. 8, in the catalyst layer of the catalyst C26, the average particle diameter of palladium was about 70 nm. In contrast, in the catalyst layer of the catalyst C1, as shown in FIG. 7, the average particle diameter of palladium was about 30 nm.

The catalyst layer of the catalyst C1 was subjected to EDX (field emission-scanning electron microscope-energy dispersive X-ray) analysis. As a result, the catalytic metal was confirmed to be made of an alloy containing palladium and iridium at the atomic ratio of 8:2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept, as defined by the appended claims and their equivalents.

What is claimed is:

1. An exhaust gas-purifying catalyst comprising:
  a support including a composite oxide having a composition represented by a general formula $AO.xB_{2-\alpha}C_\alpha O_3$, wherein A represents at least one of an element having a valence of 1 and an element having a valence of 2, B represents an element having a valence of 3, C represents iridium, x represents a numerical value within a range of 1 to 6, and $\alpha$ represents a numerical value greater than 0 and less than 2; and
  a catalytic metal supported by the support and including palladium,
  wherein the composite oxide includes at least one of hexaaluminate and a compound having a spinel structure.

2. The exhaust gas-purifying catalyst according to claim 1, wherein a ratio of an amount of the element C contained in the composite oxide to a total amount of the element C contained in the exhaust gas-purifying catalyst is 3 atomic % or more.

3. The exhaust gas-purifying catalyst according to claim 1, wherein the element A is one or more elements selected from group consisting of magnesium, calcium, strontium, and barium.

4. The exhaust gas-purifying catalyst according to claim 1, wherein the element B is at least one of aluminum and iron.

5. The exhaust gas-purifying catalyst according to claim 1, wherein the composite oxide includes at least one of a compound represented by the general formula wherein x is 1, and a compound represented by the general formula wherein x is 6.

6. The exhaust gas-purifying catalyst according to claim 1, wherein $\alpha$ is within a range of 0.0004 to 0.2.

* * * * *